United States Patent
Egland

(10) Patent No.: US 7,228,585 B1
(45) Date of Patent: Jun. 12, 2007

(54) RAIL SCRAPER

(76) Inventor: Gerry R. Egland, 22410 NE. 83rd St., Vancouver, WA (US) 98682

( * ) Notice: Subject to any disclaimer, the term of this patent is extended or adjusted under 35 U.S.C. 154(b) by 283 days.

(21) Appl. No.: 10/943,453

(22) Filed: Sep. 17, 2004

(51) Int. Cl.
*B08B 9/38* (2006.01)
*B60S 1/00* (2006.01)

(52) U.S. Cl. .................. 15/93.1; 15/246; 298/1 R; 414/475

(58) Field of Classification Search ........ 15/93.1–94.1, 15/246, 256.5; 298/1 R, 8 T; 414/547, 475, 414/517; 37/407, 410
See application file for complete search history.

(56) References Cited

U.S. PATENT DOCUMENTS

| | | | | |
|---|---|---|---|---|
| 1,479,687 A | * | 1/1924 | Wilson | ................. 37/418 |
| 4,527,301 A | * | 7/1985 | Seitz | .................. 15/250.003 |
| 4,768,645 A | * | 9/1988 | Farris | ................ 198/499 |
| 5,257,510 A | * | 11/1993 | Cox | ................ 62/346 |
| 5,456,521 A | | 10/1995 | Moyna | |

* cited by examiner

*Primary Examiner*—Gladys J P Corcoran
*Assistant Examiner*—Laura C Guidotti
(74) *Attorney, Agent, or Firm*—Rylander & Associates PC; Kurt M. Rylander

(57) ABSTRACT

A rail scraper is provided and includes a mounting plate attachable to the front of a dump truck transfer dump body, an extender attached to said plate, and a scraper attached to said extender that can be raised and lowered by said extender. A rail scraper can further be provided with a second extender attached to said plate, and a second scraper attached to said second extender. An extender for a rail scraper can be a pneumatic cylinder with an extension arm. A rail scraper can further be provided with an air valve, an air reservoir tank, and tubing connecting said tank, valve, and cylinder.

6 Claims, 3 Drawing Sheets

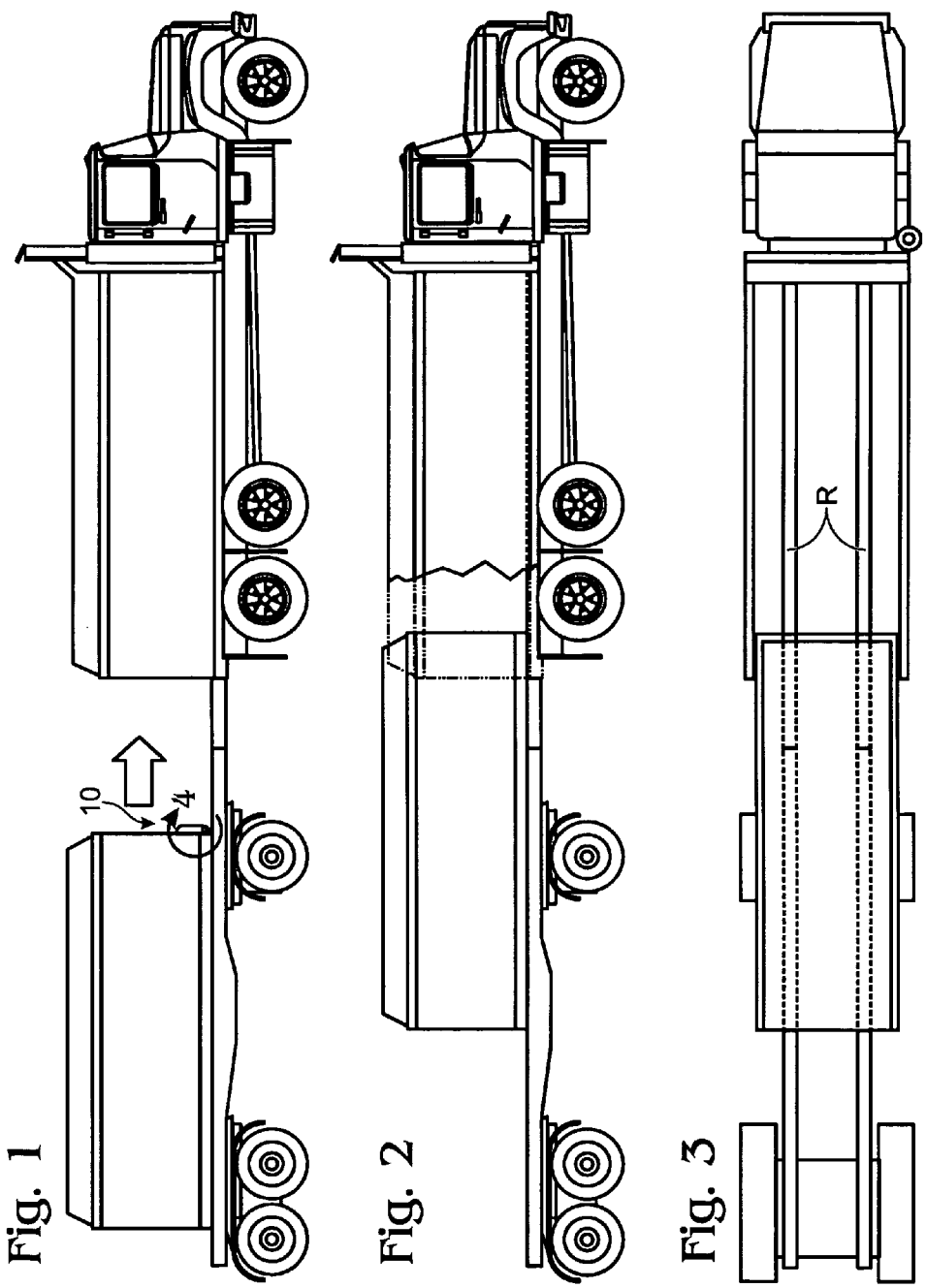

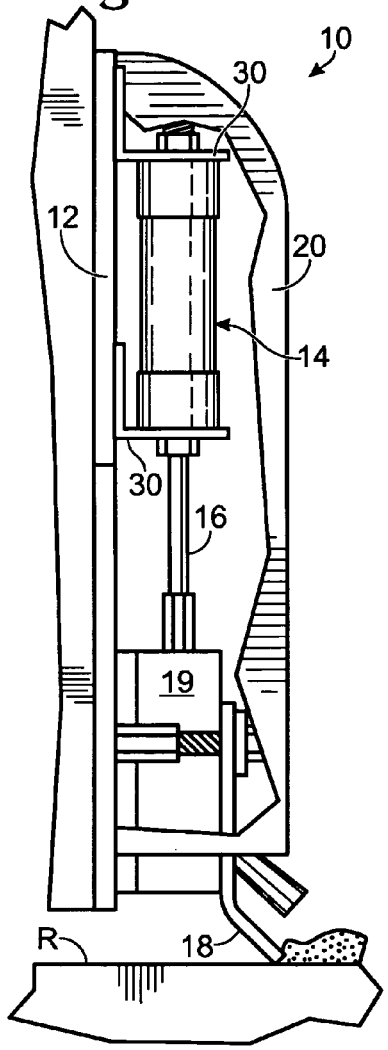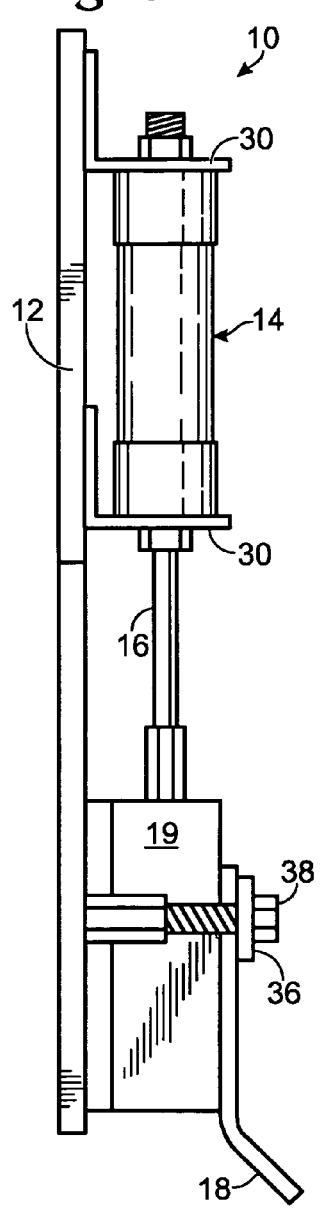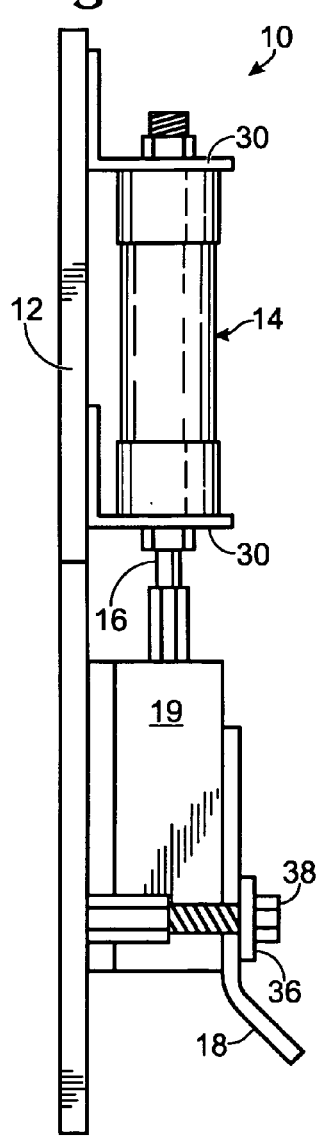

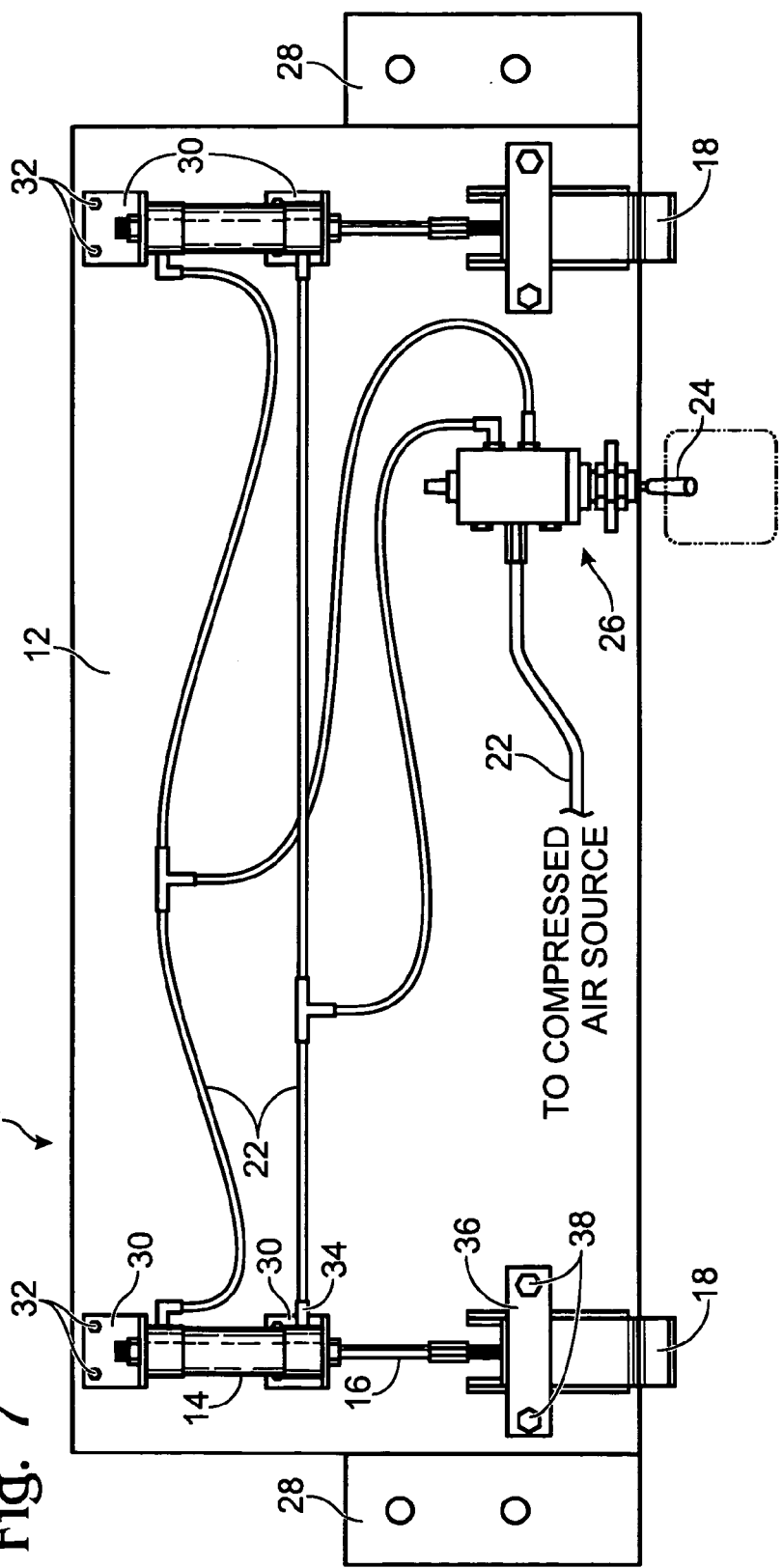

RAIL SCRAPER

FIELD OF THE INVENTION

The present invention relates to the transfer dump trucking industry. More particularly, the present invention relates to methods and apparatus for the removal of debris from transfer rails on dump truck beds.

BACKGROUND

Construction projects often require large amounts of bulk material, such as dirt, sand, asphalt, and concrete to be moved to and from the construction site. In moving such material, it is necessary to employ the use of a dump truck, which is able to transport large volumes of substance, and then remove the load by vertically tilting the truck bed. Dump trucks with an attached trailer chassis and transfer dump body, which can be moved inside the truck bed for dumping purposes via a set of transfer rails, are known as transfer dump trucks. Transfer dump trucks are preferable to single-load dump trucks for several reasons. By hauling a trailer chassis and transfer dump body, a transfer dump truck is capable to moving nearly twice the amount of bulk materials in one load as a conventional dump truck. The transfer dump body, when moved from the trailer chassis into the truck bed, allows for easier navigation than attempting to maneuver a loaded trailer.

Remnant material from the truck bed often remains embedded on the transfer rails after it is dumped, causing derailment of the transfer dump body. Such accidents can cause damage to the truck and trailer, and injure nearby persons. Additionally, scraping the transfer rails by hand is time-consuming and dangerous. Thus, there is a need for a rail scraper that operates without continual human assistance.

Presently, there are no inventions which address this issue. Presently known art attempts to address this problem, but has not completely solved the problem. The following represents a list of known related art:

| Reference | Issued to | Date of Issue |
|---|---|---|
| 5,456,521 | Moyna | Oct. 10, 1995 |

The teachings of the above-listed citations (which does not itself incorporate essential material by reference) are herein incorporated by reference. None of the above inventions and patents, taken either singularly or in combination, is seen to describe the instant invention as claimed.

SUMMARY AND ADVANTAGES

The rail scraper of the present invention includes a mounting plate attachable to the front of a dump truck transfer dump body, an extender attached to said plate, and a scraper attached to said extender that can be raised and lowered by said extender. A rail scraper can further be provided with a second extender attached to said plate, and a second scraper attached to said second extender. An extender for a rail scraper can be a pneumatic cylinder with an extension arm. A rail scraper can further be provided with an air valve, an air reservoir tank, and tubing connecting said tank, valve, and cylinder.

The rail scraper of the present invention presents numerous advantages, including: (1) eliminate the need to manually climb into a dump truck to clean the rails, which will reduce worker injuries and speed up the transfer time; (2) keep the machinery clean and free of debris; and (3) eliminate down time from having a dump body derailed due to debris with the need to be lifted back into place.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 1 shows a side view of a transfer dump truck with the trailer chassis and transfer dump body.

FIG. 2 shows a side view of the transfer dump truck with the transfer dump body of FIG. 1 being moved from the trailer chassis into the transfer dump truck FIG. 3 shows a top down view of the transfer dump truck, trailer chassis, and the transfer dump body of FIG. 2.

FIG. 4 shows a side view of a rail scraper.

FIG. 5 shows another side view of a rail scraper with the scraper in the lowered position.

FIG. 6 shows the rail scraper of FIG. 4 with the scraper in the raised position.

FIG. 7 shows a front view of a rail scraper without a protective cover.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Applicant provides a rail scraper to remove unwanted debris from the transfer rails on a transfer dump truck or a trailer chassis. As shown in FIGS. 4-7, a rail scraper 10 includes a mounting plate 12, one or more extenders, such as pneumatic cylinders 14 with extension pieces 16, attached at opposite ends of mounting plate 12, and one or more scrapers, such as angled plates 18 on blocks 19, affixed to the bottom of each extender. In preferred embodiment, rail scraper 10 extenders are pneumatic cylinders 14 with extension pieces 16 contained within each pneumatic cylinder, connected by tubing 22 to an air valve 26 and air valve switch 24 which is in turn connected to a source of compressed air. To this end an air tank reservoir (not shown) can be provided as the source of compressed air. A protective cover 20 around the extenders and partially covering the scrapers can be provided. Tubing 22 is preferably made of rubber.

As shown in FIG. 1, 4-7, mounting plate 12 is preferably rectangular and attaches to the front face of the trailer chassis that loads into the truck bed. Preferably, as shown in FIG. 7, mounting plate 12 is provided with rectangular attachment plates 28 which extend out from opposite sides of mounting plate, through which mounting plate can be attached to chassis via a plurality of metal rivets. Alternatively, other methods of securing the mounting plate 12 such as screws or bolts may be used. The mounting plate 12 has a width slightly greater than the width of the two transfer rails R. In construction, mounting plate 12 is made of steel, or another material comparable in strength and durability.

As shown in FIG. 7, in the preferred embodiment a pair of pneumatic cylinders 14 vertically attach on opposite ends of mounting plate 12. Pneumatic cylinders 14 attach to mounting plate 12 by mounting brackets 30 on the top and bottom of each pneumatic cylinder 14. Mounting brackets 30 encircle upper and lower edges of pneumatic cylinders 14 and connect to mounting plate with a plurality of bolts 32. Contained within each pneumatic cylinder is an extension piece 16. Extension piece 16 is preferably tubular. Extension piece 16 propels downward when air is supplied to the pneumatic cylinder 14. Similarly, when air releases from the pneumatic cylinder 14, extension piece 16 moves upward into its initial position within pneumatic cylinder 14. Located on the upper and lower inner edge of pneumatic cylinders 14 are circular air portals 34, which facilitate the input and release of air into pneumatic cylinders 14.

As seen in FIGS. 4-7, scrapers affix to the bottom of the extension pieces 16. In the preferred embodiment, scrapers have an angled plate 18 attached to a block 19. Block 19 attaches to the extension pieces 16. As shown in FIGS. 4-7, in preferred embodiment scrapers are angled with the angled plate 18 is being a metal rectangular piece with the distal flat end bent outward from the block 19 at an acute angle to aid in the scraping process.

Support beams 36 attached to mounting plate by attachment bolts 38 keep scrapers in horizontal alignment. Support beams 36 perpendicularly overlay scraper angled plate 18 and block 19, and bolt 38 into mounting plate 12 at opposite ends.

FIG. 7 illustrates an air valve 26. Air valve 26 attaches to bottom edge of mounting plate 12, so that air valve switch 24, located on base of air valve 26, hangs below edge of mounting plate 12. Air valve switch 24 controls airflow through air valve 26 to and from compressed air source and pneumatic cylinders 14. Air travels between air valve 24 and other components through tubing 22, preferably rubber.

To protect pneumatic cylinders 14, air valve 26, and tubing 22 during operation, a protective cover 20 can be provided. Protective cover 20 attaches to mounting plate by a plurality of bolts and entirely encloses pneumatic cylinders 14, air valve 26, and tubing 22, while allowing scraper angled plate 18 and block 19 to raise and lower through full range of motion.

In operation, in the preferred embodiment, air switch valve 24 moves to open position, opening air valve 26, allowing air from the compressed air source to pass through tubing 22 until it reaches the pair of pneumatic cylinders 14. Once air enters pneumatic cylinders 14, tubular extension pieces 16 propel downward, causing the pair of scrapers to travel onto the transfer rails R of the truck bed. As the transfer dump body moves further into the truck bed, see generally FIGS. 2-4, angled scrapers 18 continually push debris material from the transfer rails R, preventing derailment of the transfer dump body. Once the transfer dump body is empty, and being removed from the dump truck bed, air valve switch 24 moves to closed position, closing air valve 26, and removing air from the pair of pneumatic cylinders 14. This action forces tubular extension pieces 16 back into pneumatic cylinders 14, and scrapers back into raised position.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A transfer dump body with rail scraper, comprising:
   a transfer dump body, including a front leading edge, movably connected on at least one rail to dump truck;
   at least one mounting plate attached to the front leading edge of said transfer dump body, each mounting plate corresponding to each of said at least one rail;
   at least one extender attached to each of said at least one mounting plate;
   a metal scraper attached to each of said at least one extenders such that each of said at least one scrapers are configured to extend to maintain contact with a corresponding rail during travel of the transfer dump body, and are configured to retract to a stowage position when not in use.

2. The transfer dump body with rail scraper of claim 1, wherein said at least one extender is a pneumatic cylinder with an extension arm.

3. The transfer dump body with rail scraper of claim 1 or 2, further comprising an air control valve, a switch to control a state of said air control valve, an air reservoir tank, and tubing fluidly connecting said tank, control valve, and cylinder.

4. A transfer dump body and rail scraper, comprising:
   a transfer dump body including a front leading edge, capable of being transferred into a dump truck bed on one or more transfer rails set into a floor of a dump truck bed;
   a pneumatic pressure source;
   at least one a mounting plate, each of said at least one mounting plates mounted correspondingly to each transfer rail, and attached to the front leading edge of said transfer dump body;

at least one corresponding pneumatic extender attached to each of said at least one mounting plates;

at least one corresponding extension arm attached to each of said at least one extenders;

at least one corresponding scraper attached to each of said at least one extension arms;

a horizontal retaining beam mounted to said transfer dump body leading edge, corresponding to each of said at least one mounting plates, wherein said at least one scraper moves vertically between said beam and said transfer dump body leading edge;

a control valve in fluid communication with said pneumatic pressure source and each of said at least one pneumatic extenders;

a control switch in communication with said control valve;

wherein, when said transfer dump body is transferred into a dump truck bed said control switch changes state, thereby causing said control valve to change state, so that pressurized air from said pneumatic pressure source causes each of said at least one pneumatic extenders to extend and place each of said at least one scrapers in contact with its corresponding transfer rail, and further wherein, when said transfer dump body is transferred out of said dump truck bed said control switch changes state, thereby allowing said control valve to change state so that each of said at least one pneumatic extenders retracts, thereby retracting each of said at least one scraper.

5. The transfer dump body and rail scraper of claim 4, wherein said pneumatic pressure source comprises a compressed air reservoir.

6. The transfer dump body and rail scraper of claim 4, wherein said control switch comprises a mechanical switch in fluid communication with said control valve and said pneumatic pressure source.

* * * * *